(12) United States Patent
Kim

(10) Patent No.: US 7,817,751 B2
(45) Date of Patent: Oct. 19, 2010

(54) DIGITAL MULTIMEDIA BROADCASTING RECEIVER HAVING IMPROVED RECEPTION CAPABILITY AND CHANNEL ESTIMATION METHOD OF THE SAME

(75) Inventor: Jae-wook Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 959 days.

(21) Appl. No.: 11/580,384

(22) Filed: Oct. 12, 2006

(65) Prior Publication Data

US 2007/0133716 A1 Jun. 14, 2007

(30) Foreign Application Priority Data

Dec. 9, 2005 (KR) .................. 10-2005-0120454

(51) Int. Cl.
*H04L 27/06* (2006.01)
(52) U.S. Cl. .................. 375/340; 375/147; 375/148; 375/149; 375/152; 375/316; 370/328; 455/436; 455/574
(58) Field of Classification Search .......... 375/340, 375/316, 130, 148, 229, 232
See application file for complete search history.

(56) References Cited

U.S. PATENT DOCUMENTS

| | | | |
|---|---|---|---|
| 7,633,899 B2 * | 12/2009 | Choi et al. ............... | 370/329 |
| 2002/0167923 A1 * | 11/2002 | Sendonaris et al. ......... | 370/335 |
| 2003/0002472 A1 * | 1/2003 | Choi et al. .................. | 370/347 |
| 2003/0072277 A1 * | 4/2003 | Subrahmanya et al. ...... | 370/320 |
| 2003/0152170 A1 * | 8/2003 | Yousef ........................ | 375/340 |
| 2005/0262419 A1 * | 11/2005 | Becker et al. ............... | 714/758 |
| 2006/0068714 A1 * | 3/2006 | Sharma et al. ........... | 455/67.11 |
| 2006/0104236 A1 * | 5/2006 | Cho ........................... | 370/328 |

\* cited by examiner

*Primary Examiner*—Chieh M Fan
*Assistant Examiner*—Siu M Lee
(74) *Attorney, Agent, or Firm*—H.C. Park & Associates, PLC

(57) ABSTRACT

A DMB (digital multimedia broadcasting) receiver is provided, including: an equalizing unit compensating for distortion in CDM (code division multiplexing) channel signals in DMB based on a tap factor; and a channel estimation unit comparing version information contained in individual CDM channel control data in a pilot channel signal in DMB with version information contained in individual CDM channel control data in a previous pilot channel signal, and, if the version information match each other, using the CDM channel control data as a channel estimation sequence to perform a channel estimation process in a segment having no pilot symbol, and updating the tap factor of the equalizing unit according to a result of the channel estimation.

12 Claims, 5 Drawing Sheets

DIGITAL MULTIMEDIA BROADCASTING RECEIVER HAVING IMPROVED RECEPTION CAPABILITY AND CHANNEL ESTIMATION METHOD OF THE SAME

This application claims the priority of Korean Patent Application No. 2005-120454, filed on Dec. 9, 2005, in the Korean Intellectual Property Office, the disclosure of which is incorporated herein in its entirety by reference.

BACKGROUND OF THE INVENTION

1. Field of the Invention

The present invention relates to a digital multimedia broadcasting (DMB) receiver and a channel estimation method of the DMB receiver and, more particularly, to a technique of estimating DMB channels to compensate for distortion in DMB signals.

2. Description of Related Art

With the development of the Internet and media, the type of information has evolved from text to multimedia data, such as images, audio, and video.

DMB is a digital transmission system for sending multimedia data to mobile devices such as mobile phones. Fading due to multipath propagation is a major factor in the deterioration of DMB quality. The fading due to multipath propagation results from the superposition of transmitted DMB signals which have experienced differences in attenuation, delay and phase shift while traveling from a source to a DMB receiver. Thus, in the DMB receiver, channel estimation is required to compensate for channel distortions in the phase and amplitude of DMB signals due to the fading phenomenon.

FIG. 1 is a frame structure of a pilot channel signal in DMB.

The pilot channel signal in DMB has a frame structure consisting of a plurality of pilot symbols PS, a unique word D1, a frame counter D2, CDM channel control data D3~D22 and D27~D46, forward error correction (FEC) symbols D23~D26 and D47~D50, and extension information D51. The pilot symbol is a synchronous signal, the unique word is a frame synchronous signal, and the frame counter is a superframe synchronous signal.

FIG. 2 is a channel estimation diagram of a conventional DMB receiver.

Conventionally, a channel estimation process is performed using a pilot symbol PS of a pilot channel signal. That is, since the pilot symbol PS of the pilot channel signal is set to a 32-bit synchronous signal, the channel estimation process is carried out by using the pilot symbol PS as a reference for channel estimation and compensating for distortion characteristic in individual CDM channel regions corresponding to positions of the pilot symbols PS of the pilot channel signal.

However, there is a problem in that it is difficult to compensate for distortion characteristic in CDM channel regions corresponding to segments having no pilot symbols, such as CDM channel control data D3~D22 and D27~D46, and the channel estimation process needs to be carried out using more channel estimation sequences in multipath channels for accurate channel estimation.

SUMMARY OF THE INVENTION

The present invention provides a digital multimedia broadcasting (DMB) receiver that has improved reception capability by compensating for distortion in phase and amplitude of a signal due to a fading channel using more channel estimation sequences to carry out an accurate channel estimation process, and a channel estimation method of the DMB receiver.

According to an aspect of the present invention, there is provided a DMB (digital multimedia broadcasting) receiver including: an equalizing unit compensating for distortion in CDM (code division multiplexing) channel signals in DMB based on a tap factor; and a channel estimation unit comparing version information contained in individual CDM channel control data in a pilot channel signal in DMB with version information contained in individual CDM channel control data in a previous pilot channel signal, and, if the version information match each other, using the CDM channel control data as a channel estimation sequence to perform a channel estimation process in a segment having no pilot symbol, and updating the tap factor of the equalizing unit according to a result of the channel estimation.

The channel estimation unit may use the pilot symbol as a channel estimation sequence to perform a channel estimation process in a segment having the pilot symbol.

The channel estimation unit may compare version information contained in individual CDM channel control data in a pilot channel signal in DMB with version information contained in individual CDM channel control data in a previous pilot channel signal, and, if the version information does not match each other, use the pilot symbol as a channel estimation sequence to perform a channel estimation process.

The channel estimation unit may check a CRC (cyclic redundancy check) error on a received pilot channel signal, and, if no error is detected, compare version information contained in individual CDM channel control data in a pilot channel signal in DMB with version information contained in individual CDM channel control data in a previous pilot channel signal.

According to another aspect of the present invention, there is provided a channel estimation method of a DMB receiver, including: reading version information contained in individual CDM channel control data in a pilot channel signal in DMB; comparing the version information contained in the individual CDM channel control data with version information contained in individual CDM channel control data in a previous pilot channel signal; performing a channel estimation process in a segment having no pilot symbol by using the CDM channel control data as a channel estimation sequence if the version information match each other; and updating a tap factor of an equalizing unit according to a result of the channel estimation.

The step of performing a channel estimation process may perform the channel estimation process in a segment having the pilot symbol by using the pilot symbol as a channel estimation sequence.

The step of performing a channel estimation process may perform the channel estimation process by using the pilot symbol as a channel estimation sequence if the version information does not match each other.

The channel estimation method may further include checking a CRC error on a pilot channel signal, and, if no error is detected, performing the step of reading version information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 3:
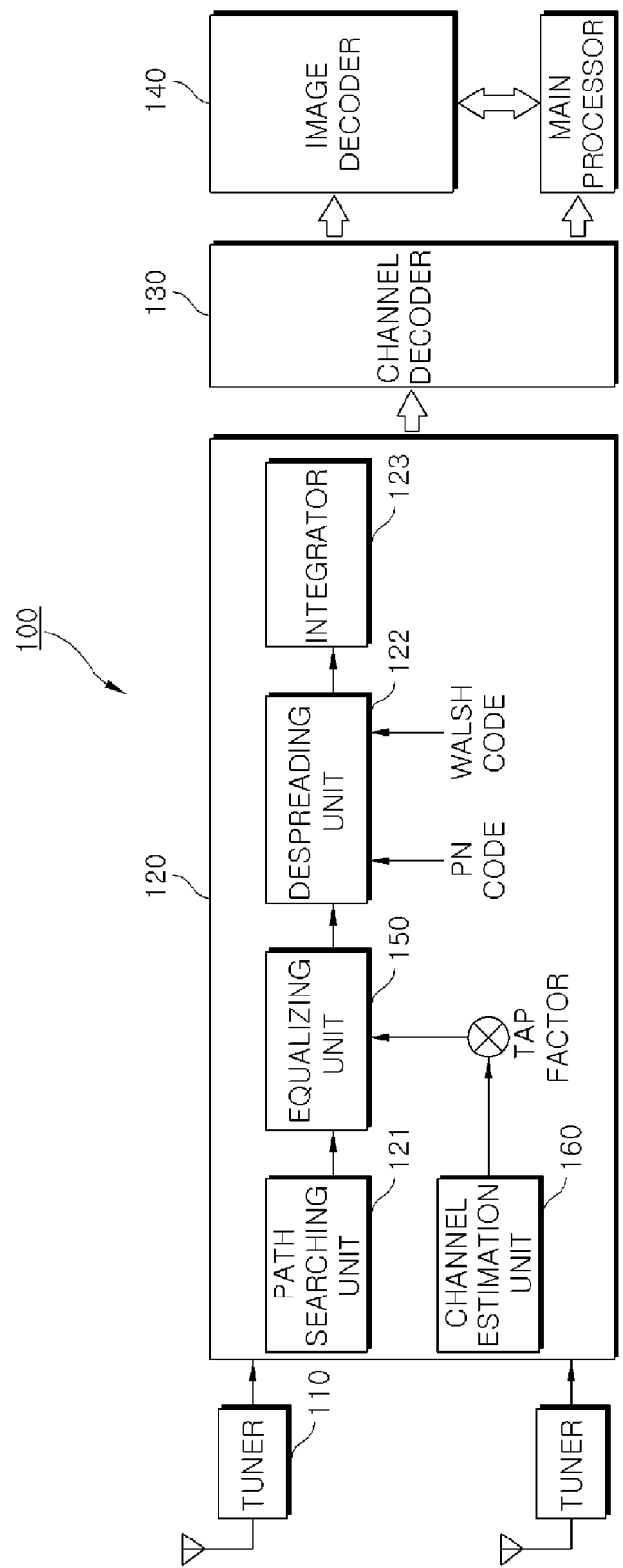
FIG. 3 is a block diagram of a DMB receiver that has improved reception capability according to an embodiment of the present invention.

FIG. 3 is a block diagram of a DMB receiver that has improved reception capability according to an embodiment of the present invention.

A DMB receiver 100 includes a tuner 110, a CDM demodulator 120, a channel decoder 130, and an image decoder 140.

The tuner 110 converts a DMB signal received through an antenna into a baseband signal.

The CDM demodulator 120 demodulates spread-modulated data converted to the baseband signal by the tuner 110, and refers to a Walsh code to extract a CDM channel signal and a pilot channel signal for a selected broadcast channel. The Walsh code is used to uniquely define individual communication channels.

The channel decoder 130 performs a forward error correction (FEC) process on the broadcast channel signal and pilot channel signal extracted by the CDM demodulator 120.

The image decoder 140 performs an image decoding process on the broadcast channel signal that is corrected by the channel decoder 130.

That is, when a DMB transmitter transmits broadcast data that has undergone FEC process and spread modulation process, the DMB receiver 100 converts the DMB signal received through an antenna into a baseband signal by means of the tuner 110, demodulates the baseband signal by means of the CDM demodulator 120, and extracts a broadcast channel signal and a pilot channel signal for a selected broadcast channel using a Walsh code serving as an identifier identifying channels in a forward link.

Next, the DMB receiver 100 performs FEC on the extracted broadcast channel signal and pilot channel signal by means of the channel decoder 130, and performs image decoding process on the corrected broadcast channel signal by means of the image decoder 140.

In more detail, the DMB receiver 100 includes an equalizing unit 150, which compensates for distortion in individual CDM channel signals in DMB based on tap factor between the CDM demodulator 120 and the channel decoder 130, and a channel estimation unit 160, which estimates channels to update the tap factor of the equalizing unit 150.

The equalizing unit 150 and the channel estimation unit 160 preferably constitute the CDM demodulator 120, together with a path searching unit 121, a dispreading unit 122, and an integrator 123. The equalizing unit 150 is well known in the art and a detailed description thereof will thus be omitted herein.

The DMB signal transmitted in multiple paths is separated by the path searching unit 121 of the CDM demodulator 120, is despreaded by the dispreading unit 122 by multiplying the separated signal by PN code and Walsh code, is integrated by the integrator 123, and is transmitted to the channel decoder 130. At this time, the channel estimation unit 160 estimates channels to update the tap factor of the equalizing unit 150, thereby compensating for distortion in individual CDM channel signals due to the fading phenomenon.

In more detail, the equalizing part 150 compensates for distortion in individual CDM channel signals in DMB based on the tap factor.

The channel estimation unit 160 compares version information contained in CDM channel control data in a pilot channel signal in DMB with version information contained in CDM channel control data in a previous pilot channel signal. If the version information match each other, the CDM channel control data is used as a channel estimation sequence to carry out the channel estimation process in segments having no pilot symbol PS, and the tap factor of the equalizing unit 150 is updated based on channel estimation results.

Figure 1:
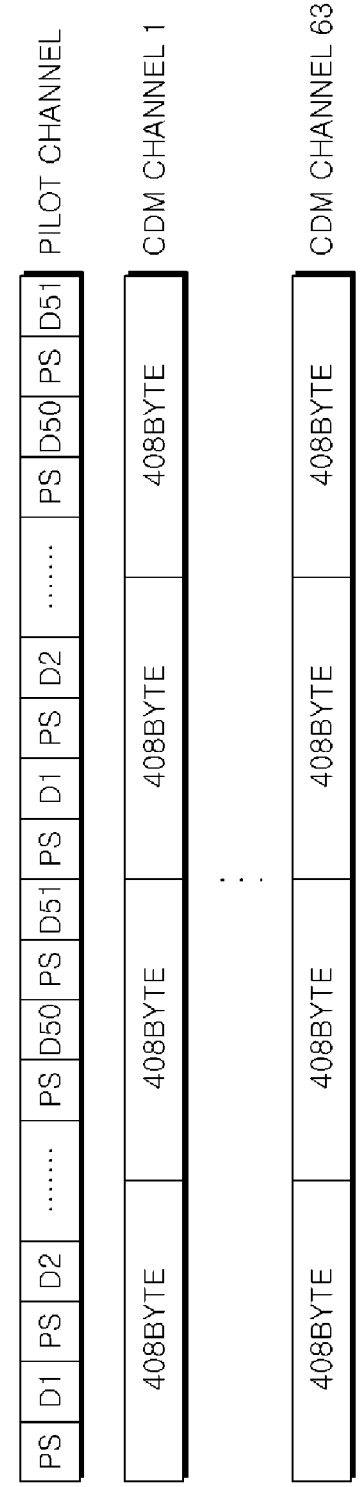
FIG. 1 is a frame structure of a pilot channel signal in DMB.
Figure 2:
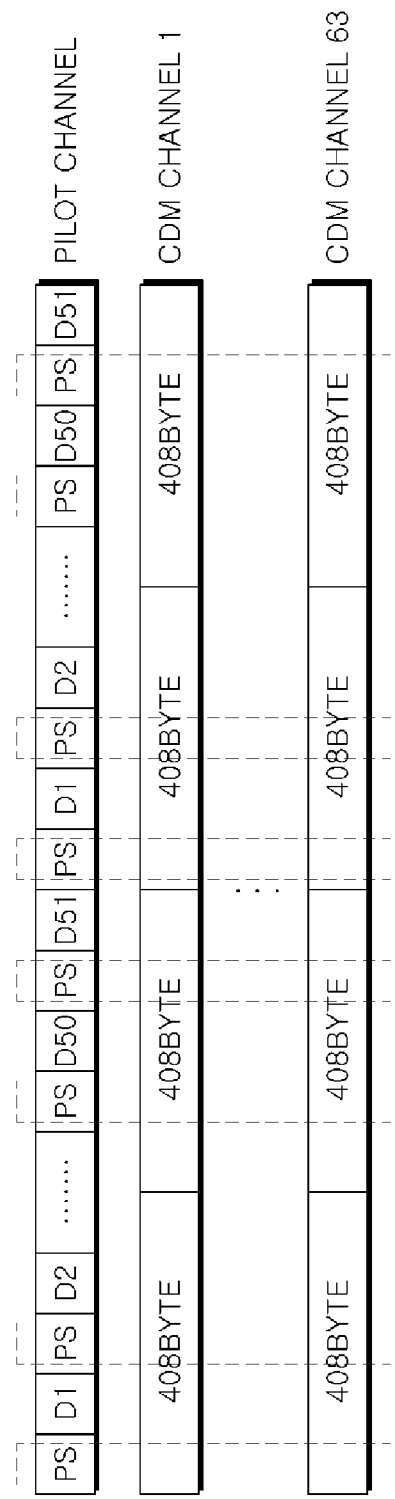
FIG. 2 is a channel estimation diagram of a conventional DMB receiver.

As shown in FIG. 1, the pilot channel signal in DMB has a frame structure of a plurality of pilot symbols PS, a unique word D1, a frame counter D2, CDM channel control data D3~D22 and D27~D46, forward error correction (FEC) symbols D23~D26 and D47~D50, and extension information D51. The CDM channel data D3~D22 and D27~D46 have a data structure shown in FIG. 4.

Figure 4:
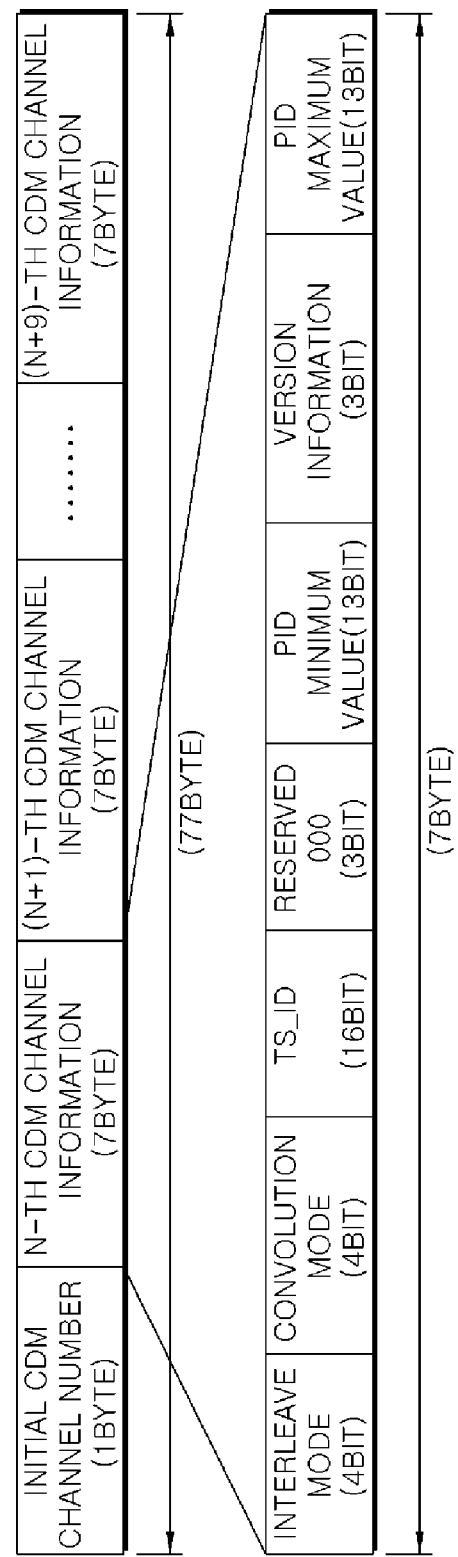
FIG. 4 is a structure of CDM channel control data.

FIG. 4 is a structure of CDM channel control data.

The CDM channel control data D3~D22 and D27~D46 contains seven bytes consisting of an interleave mode field with four bits, a convolution mode field with four bits, a TS_ID field with sixteen bits, a reserved field with three bits, a PID minimum value field with thirteen bits, a version information field with three bits, and a PID maximum value field with thirteen bits.

If the version information of CDM channel control data of a previous pilot channel signal is equal to the version information of CDM channel control data of a current pilot channel signal, the current CDM channel control data and the previous CDM channel control data match each other. Thus, the DMB receiver 100 estimates channels by using the previous CDM channel control data, which has the same version information as that of the current CDM channel control data, as a channel estimation reference signal and using the current CDM channel control data as a channel estimation sequence signal.

That is, the DMB receiver 100 compares version information contained in individual CDM channel control data in a pilot channel signal in DMB with version information contained in individual CDM channel control data in a previous pilot channel signal by means of the channel estimation unit 160, and, if the version information match each other, estimates channels using CDM channel control data as a channel estimation sequence in segments having no pilot symbol PS, and updates the tap factor of the equalizing unit 150 based on channel estimation results. The equalizing unit 150 compensates for distortions in individual CDM channel signals in DMB based on the updated tap factor.

Accordingly, it is possible to perform more accurate channel estimation in segments having no pilot symbol by using the CMD channel control data as channel estimation sequences. Thus, it is possible to continuously compensate for distortions in phase and amplitude of signals due to the fading channel, thus reducing an error in data.

In this case, the channel estimation unit 160 preferably performs the channel estimation process by using the pilot symbol as the channel estimation sequence in segments having the pilot symbol PS.

Meanwhile, the channel estimation unit 160 compares version information contained in individual CDM channel control data in a pilot channel signal in DMB with version information contained in individual CDM channel control data in a previous pilot channel signal, and, if the version information does not match each other, the channel estimation unit 160 preferably uses the pilot symbol as a channel estimation sequence to perform the channel estimation process.

That is, the DMB receiver 100 uses the pilot symbol as the channel estimation sequence in segments having the pilot symbol. In segments having no pilot symbol, i.e., in segments of CDM channel control data, the DMB receiver 100 compares version information contained in the CDM channel control data with version information contained in the previous CDM channel control data, and, if the version information match each other, uses the CDM channel control data as the channel estimation sequence, thereby performing accurate channel estimation in segments having no channel estimation reference signal. Accordingly, it is possible to continuously compensate for phase and amplitude distortions in data due to the fading phenomenon both in segments having pilot symbol and in segments having no pilot symbol.

Meanwhile, it is preferred that the channel estimation unit 160 checks a cyclic redundancy check (CRC) error on a received pilot channel signal, and, if no error is detected, compares version information contained in each CDM channel control data in a pilot channel signal in DMB with version information contained in each CDM channel control data in a previous pilot channel signal.

That is, in the present embodiment, the CRC error is checked on the received pilot channel signal, the channel estimation process is performed on DMB signals correctly transmitted, and DMB signals having errors are re-transmitted and processed.

Figure 5:
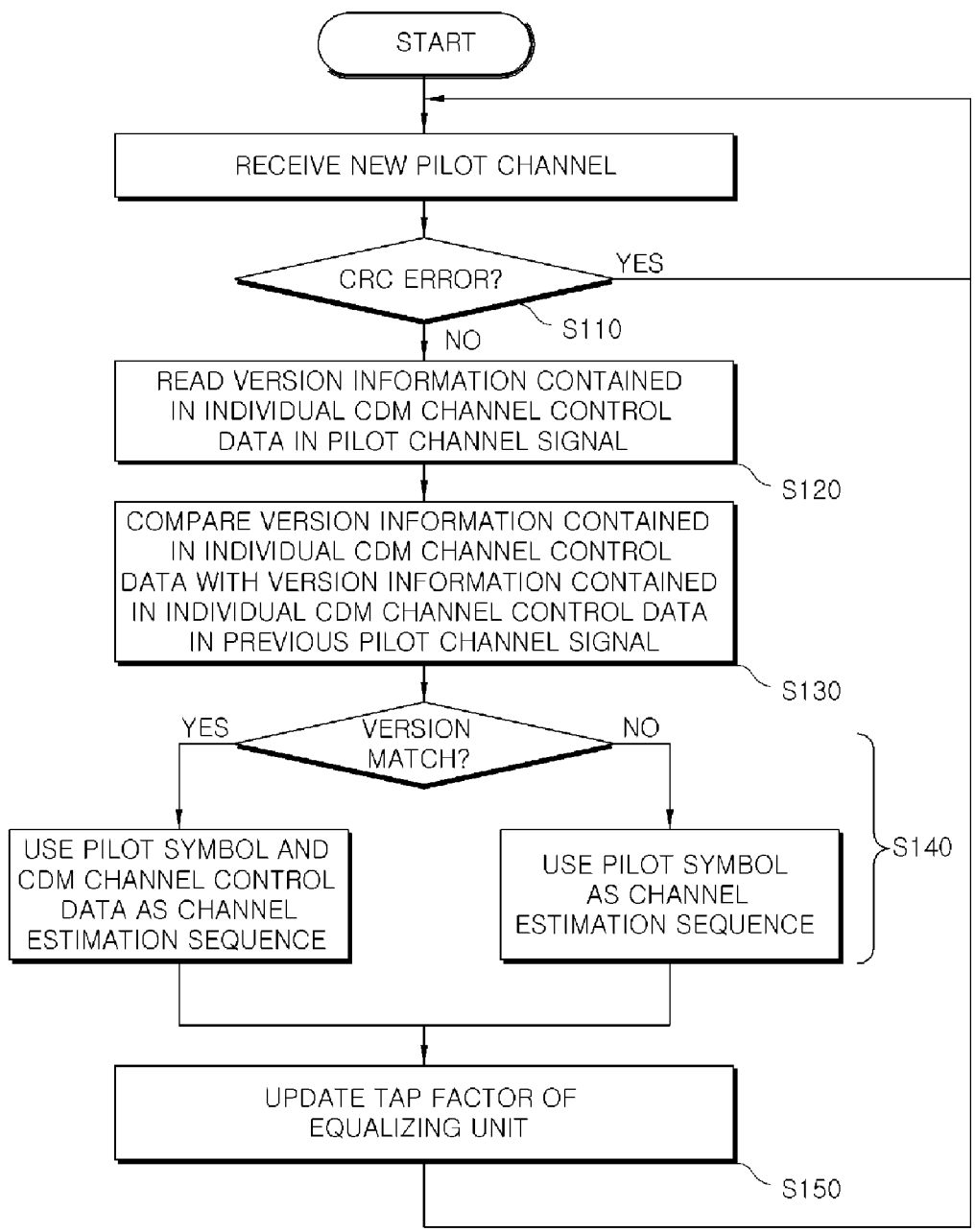
FIG. 5 is a flow chart of a channel estimation process of a DMB receiver according to an embodiment of the present invention.

FIG. 5 is a flow chart of a channel estimation process of a DMB receiver 100 according to an embodiment of the present invention.

In operation S110, when a pilot channel signal is received, the DMB receiver 100 checks CRC error on the pilot channel signal.

If an error is detected, the pilot channel signal needs to be re-transmitted. Otherwise, in operation S120, the DMB receiver 100 reads version information contained in individual CDM channel control data in the pilot channel signal in DMB.

In operation S130, the DMB receiver 100 compares the version information contained in the individual CDM channel control data read in the operation S120 with version information contained in individual CDM channel control data in a previous pilot channel signal.

In operation S140, if the version information does not match each other, the DMB receiver 100 uses a pilot symbol as a channel estimation sequence to perform a channel estimation process.

In addition, in operation S140, if the version information matches each other, the DMB receiver 100 performs the channel estimation process according to whether or not there is a pilot symbol.

That is, when it is determined in operation S130 that the version information match each other and there is no pilot symbol, the DMB receiver 100 uses the CMD channel control data as the channel estimation sequence to perform the channel estimation process in operation S140. When it is determined in operation S130 that the version information match each other and there is a pilot symbol, the pilot symbol is used as the channel estimation sequence to perform the channel estimation process.

In operation S150, the DMB receiver 100 updates the tap factor of the equalizing unit based on the channel estimation result in the operation S140.

Accordingly, the DMB receiver 100 can perform more accurate channel estimation process with increased channel estimation sequences. Accordingly, it is possible to reduce the data error by compensating for phase and amplitude distortions due to the fading channel.

As apparent from the above description, the DMB receiver and its channel estimation method according to the present invention performs a channel estimation process with increased channel estimation sequences to compensate for distortions in phase and amplitude distortions of data due to fading channels, thus improving the reception performance of the DMB receiver.

While the present invention has been described with reference to exemplary embodiments thereof, it will be understood by those skilled in the art that various changes in form and details may be made therein without departing from the scope of the present invention as defined by the following claims.

What is claimed is:

1. A DMB (digital multimedia broadcasting) receiver comprising:
    an equalizing unit to compensate for distortion in CDM (code division multiplexing) channel signals in DMB based on a tap factor; and
    a channel estimation unit to compare version information contained in individual CDM channel control data in a pilot channel signal in DMB with version information contained in individual CDM channel control data in a previous pilot channel signal, and, if the version information match each other, to use the CDM channel control data as a channel estimation sequence to perform a channel estimation process in a segment having no pilot symbol, and to update the tap factor of the equalizing unit according to a result of the channel estimation.

2. The DMB receiver of claim 1, wherein the channel estimation unit uses the pilot symbol as a channel estimation sequence to perform a channel estimation process in a segment having the pilot symbol.

3. The DMB receiver of claim 2, wherein the channel estimation unit compares version information contained in individual CDM channel control data in a pilot channel signal in DMB with version information contained in individual CDM channel control data in a previous pilot channel signal, and, if the version information does not match each other, uses the pilot symbol as a channel estimation sequence to perform a channel estimation process.

4. The DMB receiver of claim 1, wherein the channel estimation unit checks a CRC (cyclic redundancy check) error on a received pilot channel signal, and, if no error is detected, compares version information contained in individual CDM channel control data in a pilot channel signal in DMB with version information contained in individual CDM channel control data in a previous pilot channel signal.

5. The DMB receiver of claim 2, wherein the channel estimation unit checks a CRC (cyclic redundancy check) error on a received pilot channel signal, and, if no error is detected, compares version information contained in individual CDM channel control data in a pilot channel signal in DMB with version information contained in individual CDM channel control data in a previous pilot channel signal.

6. The DMB receiver of claim 3, wherein the channel estimation unit checks a CRC (cyclic redundancy check) error on a received pilot channel signal, and, if no error is detected, compares version information contained in individual CDM channel control data in a pilot channel signal in DMB with version information contained in individual CDM channel control data in a previous pilot channel signal.

7. A channel estimation method of a DMB (digital multimedia broadcasting) receiver, comprising:
  reading version information contained in individual CDM (code division multiplexing) channel control data in a pilot channel signal in DMB;
  comparing the version information contained in the individual CDM channel control data with version information contained in individual CDM channel control data in a previous pilot channel signal;
  performing a channel estimation process in a segment having no pilot symbol by using the CDM channel control data as a channel estimation sequence if the version information match each other; and
  updating a tap factor of an equalizing unit according to a result of the channel estimation.

8. The channel estimation method of claim 7, wherein the step of performing a channel estimation process comprising performing the channel estimation process in a segment having the pilot symbol by using the pilot symbol as a channel estimation sequence.

9. The channel estimation method of claim 8, wherein the step of performing a channel estimation process comprising performing the channel estimation process by using the pilot symbol as a channel estimation sequence if the version information does not match each other.

10. The channel estimation method of claim 7, further comprising checking a CRC (cyclic redundancy check) error on a pilot channel signal, and, if no error is detected, performing the step of reading version information.

11. The channel estimation method of claim 8, further comprising checking a CRC (cyclic redundancy check) error on a pilot channel signal, and, if no error is detected, performing the step of reading version information.

12. The channel estimation method of claim 9, further comprising checking a CRC (cyclic redundancy check) error on a pilot channel signal, and, if no error is detected, performing the step of reading version information.

* * * * *